(12) United States Patent
Haro (10) Patent No.: US 11,332,013 B2
(45) Date of Patent: May 17, 2022

(54) MOUNTING STRUCTURE FOR OPERATOR INTERFACE OF A MACHINE

(71) Applicant: Caterpillar Paving Products Inc., Brooklyn Park, MN (US)

(72) Inventor: Jason A. Haro, Dayton, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 322 days.

(21) Appl. No.: 16/554,820

(22) Filed: Aug. 29, 2019

(65) Prior Publication Data

US 2021/0061104 A1 Mar. 4, 2021

(51) Int. Cl.
*B60K 37/06* (2006.01)
*B60R 11/02* (2006.01)
*E05B 65/00* (2006.01)

(52) U.S. Cl.
CPC .......... *B60K 37/06* (2013.01); *B60R 11/0264* (2013.01); *E05B 65/00* (2013.01)

(58) Field of Classification Search
CPC .............................. B60K 37/06; B60R 11/0264
See application file for complete search history.

(56) References Cited

U.S. PATENT DOCUMENTS

| | | | |
|---|---|---|---|
| 6,715,269 B2 | 4/2004 | Nanlawala et al. | |
| 6,719,343 B2 | 4/2004 | Emerling et al. | |
| 7,922,267 B2 * | 4/2011 | Gevaert | A47B 21/0073 312/223.3 |
| 8,944,395 B2 | 2/2015 | Bonito et al. | |
| 9,056,587 B2 | 6/2015 | Montgomery et al. | |
| 9,783,056 B2 | 10/2017 | Klein et al. | |
| 9,963,084 B2 | 5/2018 | Jacobsthal et al. | |
| 2005/0242534 A1 * | 11/2005 | Woods | B62B 3/00 280/47.34 |
| 2012/0074006 A1 * | 3/2012 | Monaco | H04M 1/15 206/320 |
| 2013/0119640 A1 * | 5/2013 | Al-Osaimi | A61G 3/0841 280/638 |
| 2019/0110657 A1 * | 4/2019 | Carlson | B60D 1/48 |
| 2021/0061104 A1 * | 3/2021 | Haro | B60K 35/00 |
| 2021/0228806 A1 * | 7/2021 | Streeter | A61M 5/1782 |

FOREIGN PATENT DOCUMENTS

WO    2018159742    9/2018

* cited by examiner

*Primary Examiner* — David E Choi
(74) *Attorney, Agent, or Firm* — von Briesen & Roper, s.c.

(57) ABSTRACT

A mounting structure for supporting an operator interface of a construction machine is provided. The mounting structure includes an operator console, a support structure extending from the operator console, a bracket rotatably mounted to the support structure, an arm assembly coupled to the operator interface, and a lid for enclosing the operator interface. The bracket slides the operator interface between a retracted position and an extended position relative to the support structure. The arm assembly is pivotable relative to the bracket to move the operator interface between a storage position and an open position relative to the bracket. In the storage position, the operator interface is received within a storage portion and a lid encloses the operator interface within the storage portion. In the open position, the operator interface is moved away from the storage portion.

20 Claims, 9 Drawing Sheets

MOUNTING STRUCTURE FOR OPERATOR INTERFACE OF A MACHINE

TECHNICAL FIELD

The present disclosure relates to a mounting structure for operator interface of a machine. More particularly, the present disclosure relates to a mounting structure that facilitates movement of the operator interface towards and away from an operator and also storage of the operator interface.

BACKGROUND

Construction machines, for example, cold planers, are widely used for purposes, such as for recycling and/or reclaiming a road surface. Such machines may include one or more operator stations, an interior of which may be freely accessed by operators, servicemen, technicians, etc., from one or more sides of the machine. Such operator stations commonly include one or more operator interfaces having displays, switches, indicators, levers, touchscreens, various input devices, etc., manipulating one or more of which enables an operator to perform one or more of the many functions of the machine.

In many situations, e.g., during an operation of the machine, the operator may find the operator interface away and/or inaccessible for ready use, and, accordingly, may need to extend and reach out (possibly by moving out of an operator seat) all the way to the operator interface so as to access the operator interface. Such a chore may unduly strain the operator and may make the environment in the operator station tiresome, affecting the operator's work productivity and quality. In other cases, if such an operator station is left unattended, one or more component/devices (e.g., an operator interface) of the operator station may become prone to misuse and theft.

U.S. Pat. No. 9,056,587 relates to an adjustable mounting assembly having a telescoping compound slide assembly with at least one movable rail and slider. The moveable rail and slider can translate to move a display mount linearly between the front or rear of the vehicle. Detents or other positioning elements can be provided on the rails and slider as well as at preset angular orientations of the display mount. The adjustable mounting assembly thus allows the vehicle operator to readily adjust the display interface to be viewable when in the front and rear facing seating orientations of the vehicle.

SUMMARY OF THE INVENTION

In an aspect of the present disclosure, a mounting structure for supporting an operator interface of a machine is provided. The mounting structure includes an operator console, a support structure extending from the operator console, a bracket rotatably mounted to the support structure, an arm assembly coupled to the operator interface, and a lid for enclosing the operator interface. The bracket is configured to slide between a retracted position and an extended position relative to the support structure. Further, the arm assembly is pivotable relative to the bracket to move the operator interface between a storage position and an open position relative to the bracket. In the storage position, the operator interface is received within a storage portion of the operator console and in the open position, the operator interface is moved away from the storage portion of the operator console. Also, in the storage position, the lid encloses the operator interface within the storage portion of the operator console.

In another aspect of the present disclosure, an operator station for a machine is provided. The operator station includes an operator interface, a mounting structure for supporting the operator interface within the operator station. The mounting structure includes an operator console, a support structure extending from the operator console, a bracket rotatably mounted to the support structure, an arm assembly coupled to the operator interface, and a lid for enclosing the operator interface. The bracket is configured to slide between a retracted position and an extended position relative to the support structure. The arm assembly is pivotable relative to the bracket to move the operator interface between a storage position and an open position relative to the bracket. In the storage position, the operator interface is received within a storage portion of the operator console and in the open position, the operator interface is moved away from the storage portion of the operator console. Further, the lid encloses the operator interface within the storage portion of the operator console when the operator interface is in the storage position.

In a yet another aspect of the present disclosure, a construction machine is provided. The construction machine includes an operator station including an operator interface and a mounting structure for supporting the operator interface within the operator station. The mounting structure includes an operator console, a support structure extending from the operator console, a bracket being rotatably mounted to the support structure, a fluid operated strut coupled to the bracket, an arm assembly and a lid for enclosing the operator interface. The fluid operated strut is configured to slide the bracket between a retracted position and an extended position relative to the support structure. The arm assembly defines a lower end and a top end. The lower end is pivotably connected to the bracket at a pivot joint and the top end is coupled to the operator interface. The arm assembly is pivotable relative to the bracket to move the operator interface between a storage position and an open position relative to the bracket. In the storage position, the operator interface is received within a recessed compartment of the operator console and in the open position, the operator interface is moved away from the recessed compartment of the operator console. Further, the lid encloses the operator interface within the recessed compartment of the operator console when the operator interface is in the storage position.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
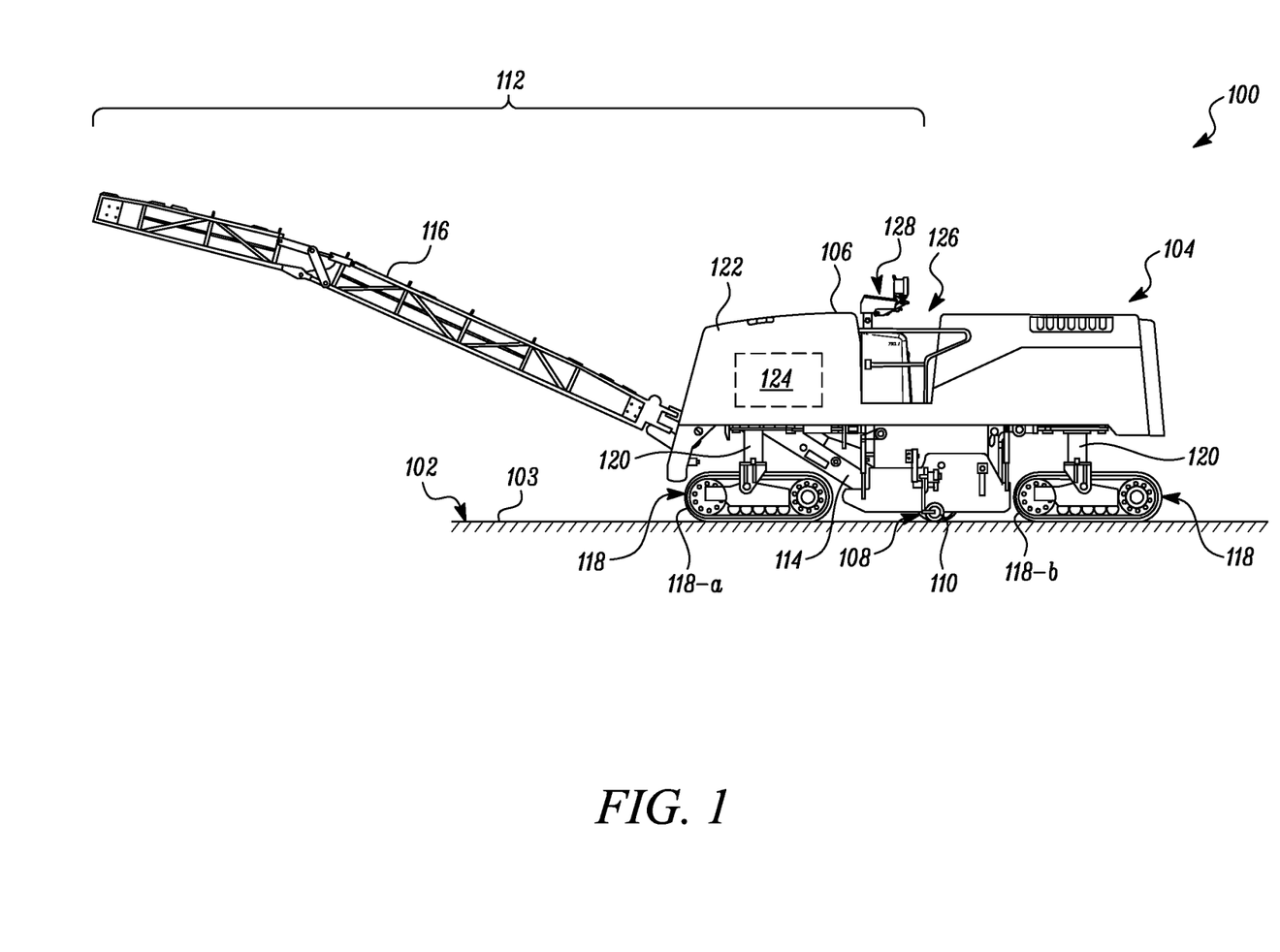
FIG. 1 illustrates an exemplary construction machine operating at a worksite, in accordance with embodiments of the present disclosure.

FIG. 1 illustrates an exemplary construction machine 100 operating at a worksite 102, in accordance with embodiments of the present disclosure. The worksite 102 may include, for example, a mine site, a quarry, a construction site, or any other type of worksite. As illustrated, the construction machine 100 is embodied as a cold planar 104 for removing material, such as hardened asphalt, from a ground surface 103, at the worksite 102. However, in various other embodiments, the construction machine 100 may be any machine used for surface altering operations such as motor graders, millers, dozers, compactors, pavers and profilers or the like. Further, the construction machine 100 may be a manned machine or an unmanned machine. In some embodiments, the construction machine 100 may be a machine having various levels of autonomy, such as a fully autonomous machine, a semi-autonomous machine, a remotely operated machine, or a remotely supervised machine.

The construction machine 100 includes a frame 106 configured to support various components of the construction machine 100. For example, the frame 106 may support a material removal mechanism 108 that includes a rotor 110 having a plurality of teeth (not shown) to cut or grind a top layer of the ground surface 103. It may be contemplated that the material removal mechanism 108 is not limited to such an arrangement and may be varied to achieve similar results. Although FIG. 1 shows the material removal mechanism 108 housed in a central, lower portion of the construction machine 100, the material removal mechanism 108 may be disposed in any other place on the construction machine 100. Alternatively, or additionally, the construction machine 100 may include one or more supplementary grinding mechanisms (not shown) located in rear and/or forward positions of the construction machine 100.

A conveyor system 112 may be connected to the frame 106 and configured to transport material away from the material removal mechanism 108 and into a receptacle, such as a waiting haul vehicle (not shown). The conveyor system 112 may include a first conveyor 114 positioned adjacent to the rotor 110 and configured to receive milled material from material removal mechanism 108 and provide the milled material to a second conveyor 116. The second conveyor 116 may receive the milled material and dispense it into the haul vehicle.

The frame 106 is supported by one or more ground engaging devices 118. As illustrated, the ground engaging devices 118 may include a pair of front tracks 118-a and a rear tracks 118-b (only one side shown) to facilitate movement of the construction machine 100 at the worksite 102. In alternative embodiments, the ground engaging devices 118 may include wheels or the like, without deviating from the scope of the claimed subject matter. Each of the ground engaging devices 118 is connected to an actuator 120 configured to raise and/or lower the frame 106 and consequently vary a milling depth of the rotor 110 into the ground surface 103.

The frame 106 further supports a compartment 122 to house a power unit 124 and an operator cabin 126. The power unit 124 may include an engine, hereinafter referred to as the engine 124, that may be based on one of the commonly applied power-generation units. For example, the engine 124 may include an internal combustion engine (ICE) having a V-type configuration engine, an in-line, configuration engine, or an engine with different configurations, as is conventionally known. However, aspects of the present disclosure, need not be limited to any particular type of engine.

The operator cabin 126 provides a platform/station that can be freely accessed by operators, servicemen, technicians, etc., to operate the construction machine 100. For example, the operator cabin 126 is devoid of doors because of which operators, servicemen, etc., may freely access the interior of the operator cabin 126. In an embodiment of the present disclosure, the operator cabin 126 includes an operator station 128 including one or more of electronic panels, displays, buttons, joysticks and various other physically actuable entities that facilitate controlling of the construction machine 100. It may be contemplated that the operator cabin 126 may be located on board the construction machine 100 or remotely located in case the construction machine 100 is a remotely operated machine. The details of the operator station 128 are further described in the following description with reference to FIGS. 2 to 9.

Figure 2:
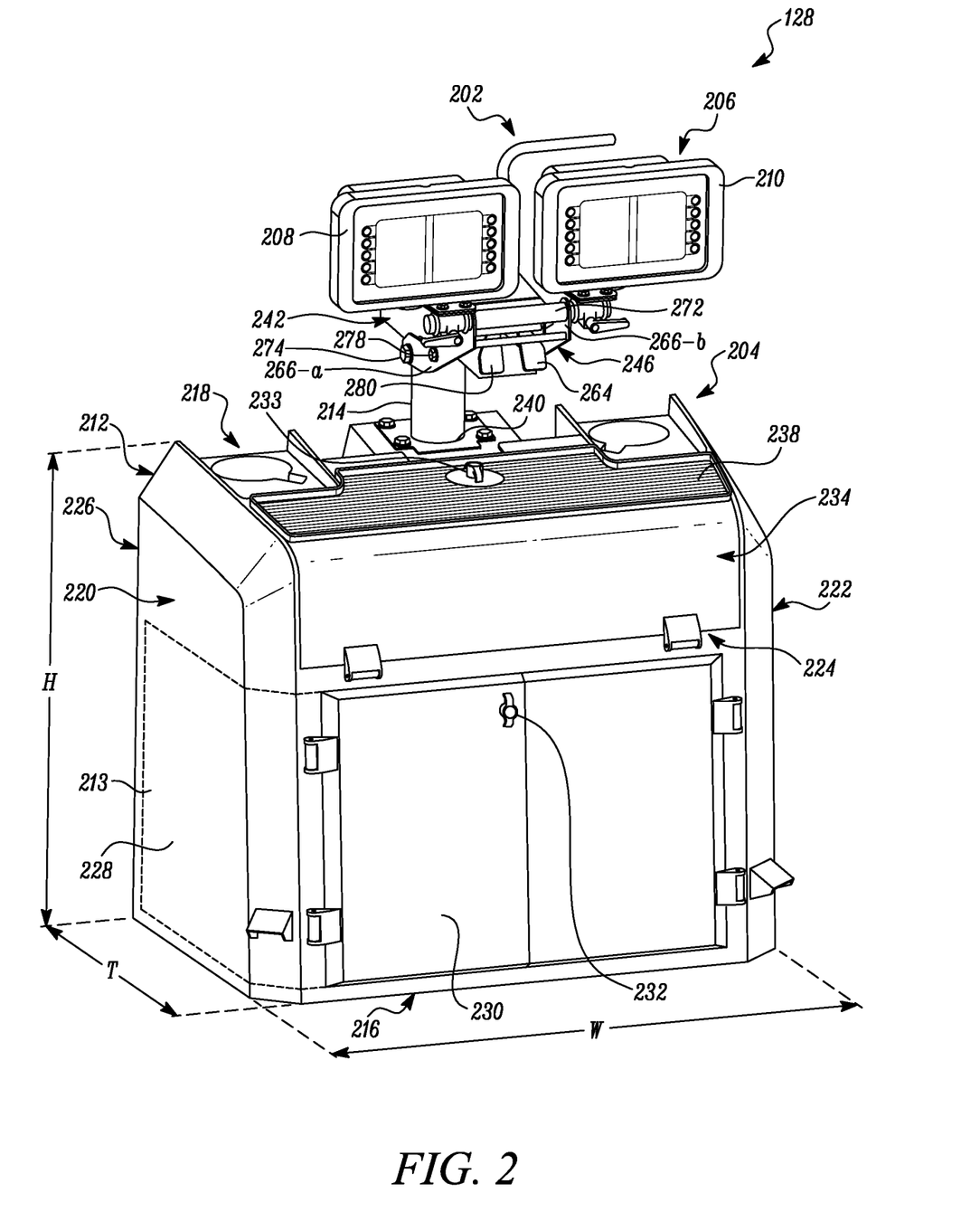
FIG. 2 illustrates an exemplary operator station for the construction machine, in accordance with the embodiments of the present disclosure.
Figure 3:
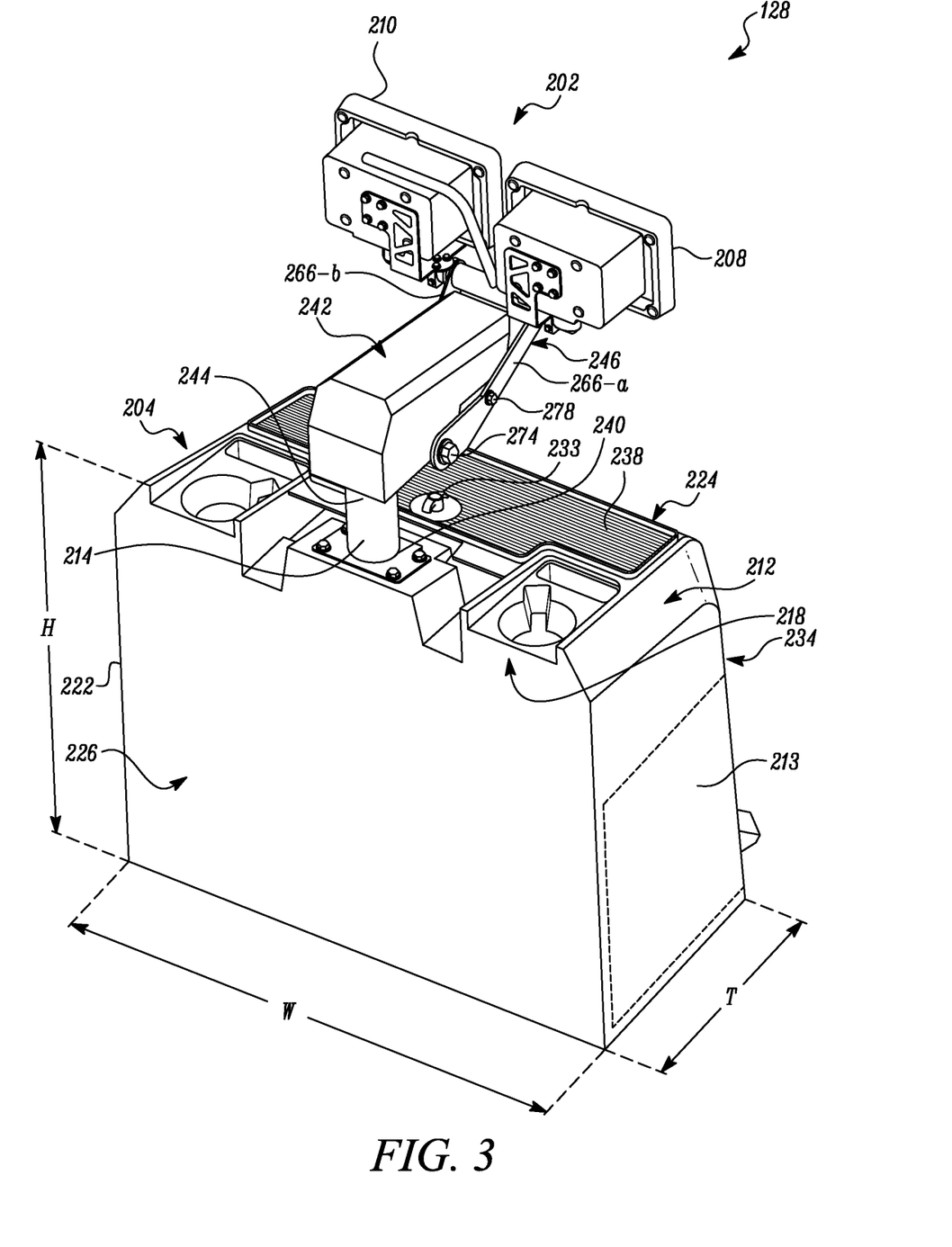
FIG. 3 illustrates a back view of the operation station with an exemplary mounting structure, an exemplary support structure, and an exemplary storage portion covered with an exemplary lid, in accordance with the embodiments of the present disclosure.

FIGS. 2 and 3 illustrate an exemplary operator station 128 in accordance with an embodiment of the present disclosure. The operator station 128 includes an operator interface 202 and a mounting structure 204 supporting the operator interface 202 within the operator station 128. In an embodiment of the present disclosure, the operator interface 202 includes display system 206 including a first display device 208 and a second display device 210 configured to facilitate reception of inputs and provide outputs for controlling of the one or more operations of the construction machine 100. The display devices 208, 210 may include a display screen, a touchscreen device, monitors, display panels etc. Although there are two display devices illustrated and described herein, it may be contemplated that the number of display devices may be varied to achieve similar results without deviating from the scope of the claimed subject matter. Additionally, or alternatively, the operator interface 202 may include fewer or additional elements, not described herein for the sake of brevity of the disclosure.

It may be contemplated that the operator interface 202 may form a part of a control system (not shown) that operates to control various operations of the construction machine 100. For example, the control system may include a controller (not shown) operatively connected to the operator interface 202 and a memory device (not shown) to execute the instruction stored therein to perform predetermined operations associated with the construction machine 100. Working and operational connections of the control system may be well known in the art and therefore, not described herein for the sake of brevity of the disclosure.

In an embodiment of the present disclosure, the mounting structure 204 includes an operator console 212 and a support structure 214 extending from the operator console 212. In one example, the operator console 212 may be a cabinet 213 having a lower end 216 and a top end 218 defining a height H of the operator console 212. Further, the operator console 212 includes a first side 220, a second side 222 defining a width W of the operator console 212 whereas a front end 224 and a back end 226 define a thickness T of the operator console 212.

The operator console 212 includes a first stowing portion 228 positioned near the lower end 216 of the cabinet 213 and a front access door 230 to provide access to the first stowing portion 228 for the operator. The front access door 230 may be locked or unlocked using a first key lock 232. In other embodiments of the present disclosure, the front access door 230 may be situated on other sides of the first stowing portion 228 like back or sides. The first stowing portion 228 may be provided for neatly storing all the wires and cables of the operator station 128. Additionally, the first stowing portion 228 may also provide additional storage space for the operator to store any additional belongings. In an exemplary implementation, the first stowing portion 228 may extend through the thickness T of the cabinet 213.

In an embodiment of the present disclosure, the operator console 212 includes a storage portion 234 configured to store the operator interface 202 therein. The storage portion 234 defines a recessed compartment 236 (shown in FIG. 4) to receive the operator interface 202 therein, when the operator interface 202 is not in use and needs to be stored in a safe and secure position to prevent it from any kind of misuse, damages, theft and/or vandalism. Further, the operator console 212 includes a lid 238 configured to close and lock the storage portion 234 using a second key clock 233 that may be, but not limited to, one of a magnetic key, a locking ball, a knob key, a valet key, a keycard, or a padlock key, and enclose the operator interface 202 within the recessed compartment 236 when the operator interface 202 is not in use.

As illustrated in the figures, the support structure 214 may be a cylindrical support structure extending upright and upwards from the operator console 212 and having a lower end 240 fixedly coupled to the operator console 212. The mounting structure 204 further includes a bracket 242 rotatably mounted to a top end 244 of the support structure 214 (as shown in FIG. 3). The bracket 242 is configured to rotate about the support structure 214 and consequently rotate the operator interface 202 laterally between a left extended position and a right extended position (not shown).

Figure 6:
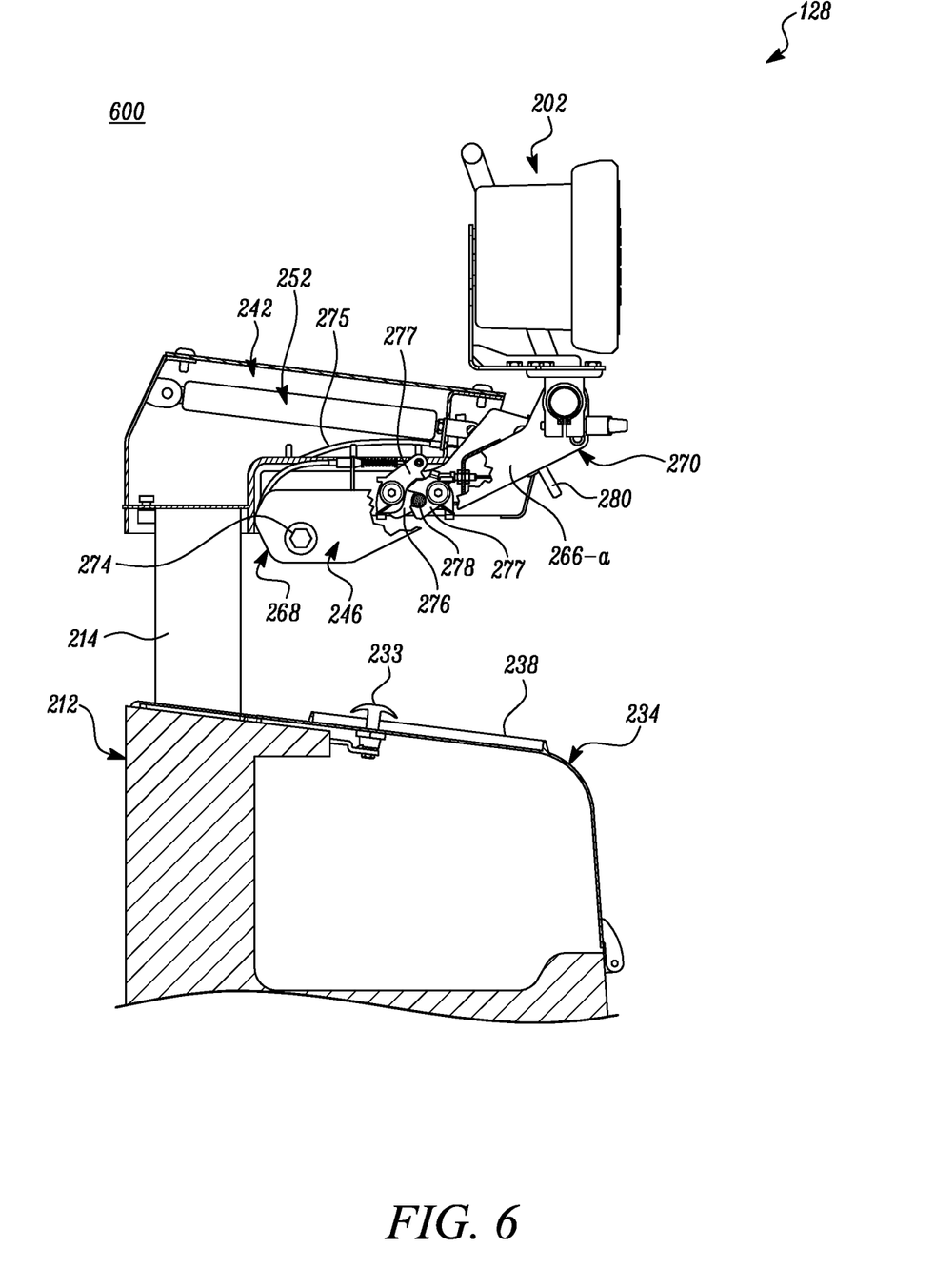
FIG. 6 illustrates an exemplary clasp lock assembly and the operator interface in the open position, in accordance with the embodiments of the present disclosure.
Figure 7:
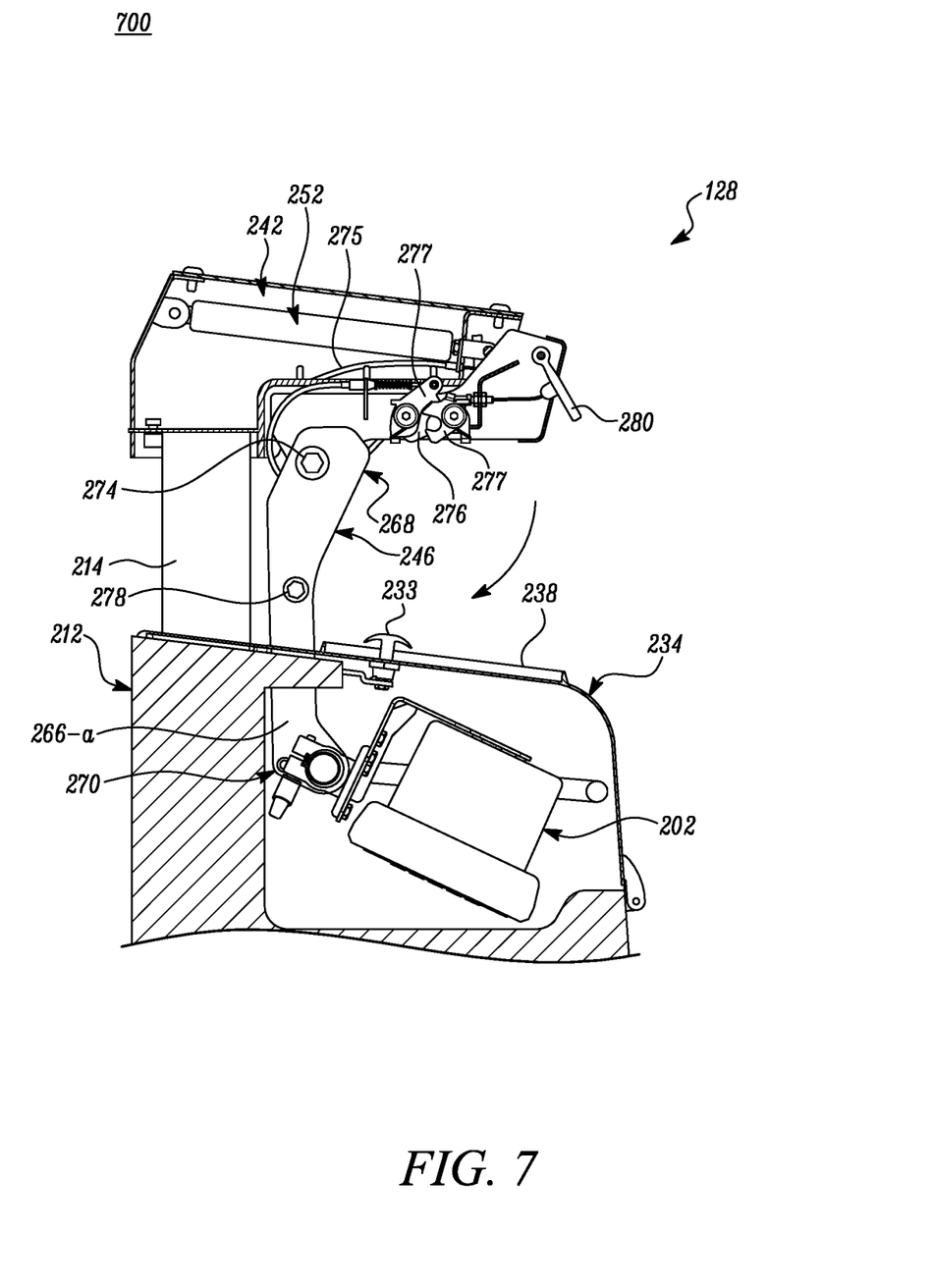
FIG. 7 illustrates the operator interface in the storage position where the operator interface is received in the recessed compartment and locked with the lid, in accordance with the embodiments of the present disclosure.

Further, in an embodiment of the present disclosure, the mounting structure 204 includes an arm assembly 246 coupled to the operator interface 202 and configured to pivot relative to the bracket 242 to move the operator interface 202 up and down between an open position 600 and a storage position 700 relative to the bracket 242 (as shown in FIG. 6 and FIG. 7 respectively). In an embodiment of the present disclosure, in the storage position 700, the operator interface 202 is pulled down and stored in the storage portion 234 (as shown in FIG. 7), whereas in the open position 600, the operator interface 202 is moved away from the storage portion 234 and positioned upright to be used for operation (as shown in FIG. 6). The constructional and operational details of the bracket 242 and the arm assembly 246 will now be described in detail.

Figure 4:
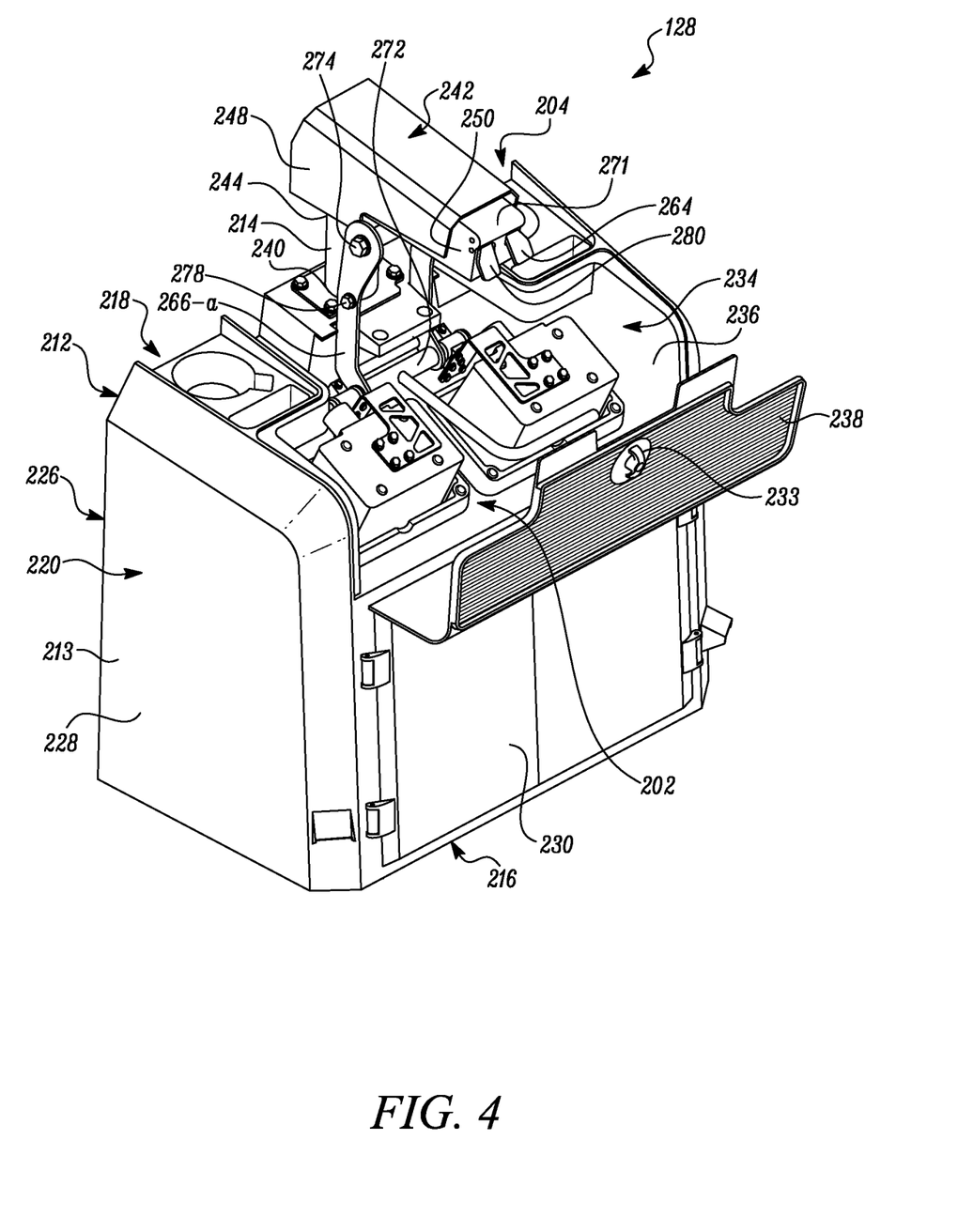
FIG. 4 illustrates a front view of the operation station with ab exemplary recessed compartment opened by the lid to receive an exemplary operator interface, in accordance with the embodiments of the present disclosure.
Figure 5:
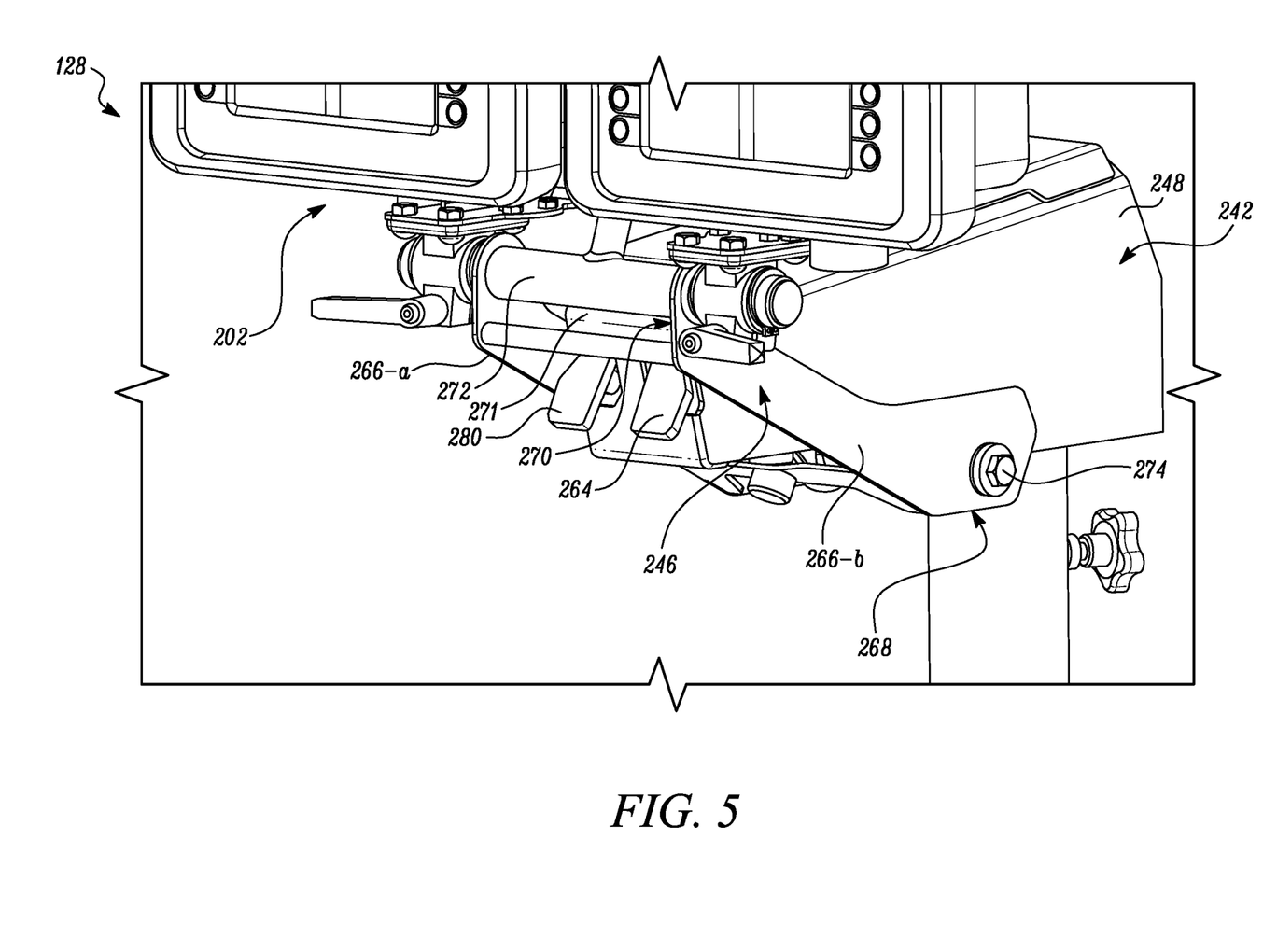
FIG. 5 illustrates an enlarged view of the operator interface, the bracket and an exemplary actuator, in accordance with the embodiments of the present disclosure.
Figure 8:
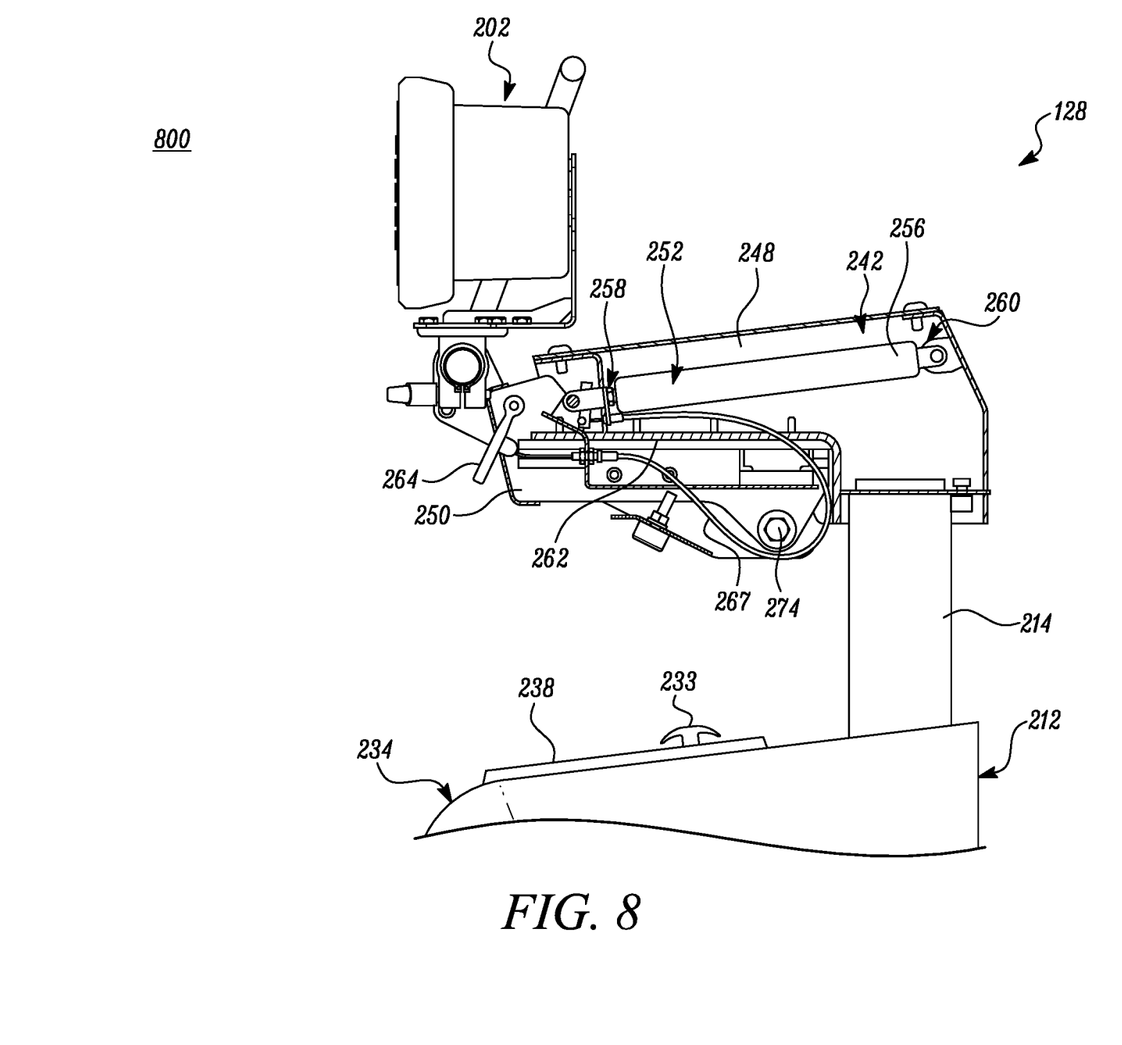
FIG. 8 illustrates an exemplary fluid operated strut and an exemplary bracket and the operator interface in a retracted position, in accordance with the embodiments of the present disclosure.
Figure 9:
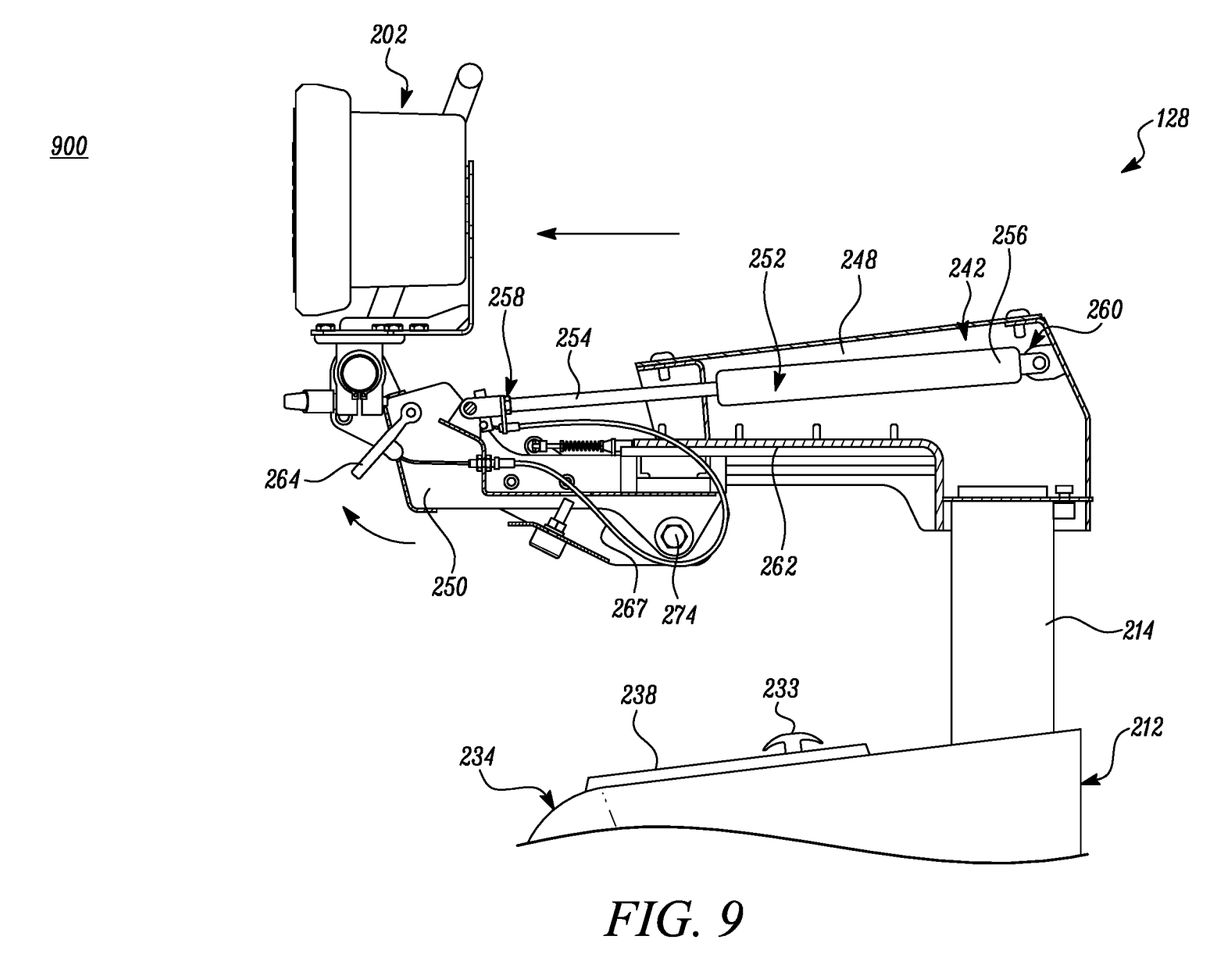
FIG. 9 illustrates an operation of the exemplary fluid operated strut to slide the exemplary bracket and move the operator interface to an extended position, in accordance with the embodiments of the present disclosure.

In an embodiment of the present disclosure, the bracket 242 includes a first cover portion 248 rotatably coupled to the support structure 214 and a second portion 250 (as shown in FIG. 4) releasably coupled to the first cover portion 248 to enclose a support assembly therein, that supports the operator interface 202 thereon. In an embodiment of the present disclosure, the bracket 242, such as the second portion 250 of the bracket 242 is configured to slide between a retracted position 800 and an extended position 900, thereby sliding the operator interface 202 between the retracted position 800 and the extended position 900 (as shown in FIGS. 8 and 9, respectively) with respect to the support structure 214. To this end, the mounting structure 204 includes a fluid operated strut 252 having a rod 254 and a piston (not shown) within a cylinder 256 and configured to be hydraulically or pneumatically operated (as shown in FIG. 9). The fluid operated strut 252 defines a first end 258 coupled to the second portion 250 of the bracket 242 and a second end 260 coupled to the first cover portion 248 of the bracket 242. In various exemplary implementations, the strut 252 may be a gas strut or a hydraulically operated strut or the like.

In an embodiment of the present disclosure, the second portion 250 of the bracket 242 is releasably coupled to the first cover portion 248 via a rail 262 to facilitate sliding of the second portion 250 between the retracted position 800 and the extended position 900. In an embodiment of the present disclosure, the mounting structure 204 includes a first actuator 264 operably coupled and configured to actuate the fluid operated strut 252 for sliding the second portion 250 of the bracket 242 between the extended position 900 and the retracted position 800. For example, the first actuator 264 is connected to a strut head (not shown) at the first end 258 of the fluid operated strut 252 via a first cable 267, such that when the first actuator 264 is pulled or actuated by the operator, the first cable 267 is pulled to release the strut head, thereby allowing the strut 252 to move forward and backward and consequently moving the second portion 250 of the bracket 242 on the rail 262 between the extended position 900 and the retracted position 800.

In one example, the operator of the construction machine 100 may press or actuate the first actuator 264 and move the bracket 242, and consequently the operator interface 202, manually between the extended position 900 and the retracted position 800. In other embodiments, the movement of the bracket 242 and the operator interface 202 between the extended position 900 and the retracted position 800 may be automated and the first actuator 264 may be implemented as an electrical switch to activate the movement of the bracket 242.

Referring back to FIGS. 2 to 7, the arm assembly 246 includes a pair of arms 266 (266-a, 266-b) and defines a lower end 268 and a top end 270 (shown more clearly in FIG. 5). The arm assembly 246 further includes an access handle 272 positioned at the top end 270 and connected in between and to each of the arms 266. Further, the operator interface 202 is coupled to the access handle 272 and is rotatable about the access handle 272. The access handle 272 is configured to engage with a complimentary member 271 (see FIG. 4) provided on the bracket 242, when the operator interface 202 is in the open position 600. The access handle 272 is further configured to provide an access for the operator to hold and move the operator interface 202 between the left and right extended positions (not shown), open position 600, the storage position 700, the retracted position 800, and the extended position 900.

In an embodiment of the present disclosure, the lower end 268 of the arm 266 is pivotally connected to the bracket 242, such as to the first cover portion 248 of the bracket 242 at a pivot connection 274. The arm assembly 246 is configured to pivot about the pivot connection 274 with respect to the bracket 242 to facilitate moving of the operator interface 202 up and down between the open position 600 and the storage position 700.

In an exemplary embodiment of the present disclosure, the arm assembly 246 is further removably coupled to the bracket 242, such as to the second portion 250 of the bracket 242, by a lock assembly 276 (shown in FIGS. 6 and 7). Although the lock assembly 276 is shown and provided only on one of the arms, such as the arm 266-a, it may be contemplated that the lock assembly 276 may also be provided on the other arm 266-b without deviating from the scope of the claimed subject matter. In one example, the lock assembly 276 is a clasp lock assembly including clasps 277. However, other types of lock assemblies may also be implemented without deviating from the scope of the claimed subject matter.

In an exemplary embodiment of the present disclosure, the arm 266-a includes a latch pin 278 (shown in FIGS. 2 and 4) for locking the arm 266-a with the lock assembly 276. The mounting structure 204 further includes a second actuator 280 operatively coupled and configured to operate the lock assembly 276 via a second cable 275, and in turn facilitate locking and unlocking of the arm assembly 246 from the lock assembly 276 and the bracket 242. For example, when the operator pulls the second actuator 280, the clasps 277 of the lock assembly 276 open to release the latch pin 278, thereby releasing the arm assembly 246 and allowing it to pivot freely about the pivot connection 274. Therefore, the arm assembly 246 can be moved downwards to move the operator interface 202 to the storage position 700. Similarly, when the operator interface 202 is required to be moved to the open position 600, the operator may pull the second actuator 280 to open the clasps 277, engage the latch pin 278 and subsequently release the second actuator 280 to close the clasps 277, thereby locking the latch pin 278 and the arm assembly 246 back to the bracket 242.

INDUSTRIAL APPLICABILITY

The mounting structure 204 according to the embodiments of the present disclosure, provides for a safe and secure mounting of the operator interface 202 within the operator station 128. For example, to keep the operator interface 202 safe and secure from any kind of misuse, damage, theft and/or vandalism, the operator interface 202 can be stored and locked within the storage portion 234, when not in use. Accordingly, whenever the operator of the construction machine 100 wants to use the operator interface 202, the operator interface 202 can be pulled out of the storage portion 234 and locked in the open position 600. Additionally, the mounting structure 204 provides easy accessibility for the operator, in that, the operator may move the operator interface 202 closer by extending it forward. The mounting structure 204 also facilitates sliding of the operator interface 202 towards left and right direction to provide easy access of the operator interface 202 to the operator.

As shown in FIGS. 6 to 9, the operator interface 202 is configured to move between the various positions, such as the open position 600, the storage position 700, the retracted position 800 and the extended position 900. For example, at stage one (as shown in FIG. 6), the operator interface 202 is in the open position 600 as well as retracted position 800. In the open position 600, the arm assembly 246 is also locked with the lock assembly 276 and the bracket 242. FIG. 9 illustrates stage two, where the operator interface 202 is in the open position 600 and the extended position 900. For this, the operator pulls the first actuator 264 to move the bracket 242, such as the second portion 250 of the bracket 242, to the extended position 900. In this position, the operator interface 202 remains in the open position 600 and the arm assembly 246 remains in the locked position with the lock assembly 276.

Further, FIG. 7 illustrates the storage position 700 of the operator interface 202. For this, the operator may pull the second actuator 280 to release the latch pin 278 from the lock assembly 276 and move the arm assembly 246 along with the operator interface 202 downwards to be stored within the storage portion 234 of the operator console 212. In the storage position 700 of the operator interface 202, the lid 238 is closed to enclose the operator interface 202 within the storage portion 234.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A mounting structure for supporting an operator interface of a machine, the mounting structure comprising:
   an operator console;
   a support structure extending from the operator console, the supporting structure fixed at a first end to the operator console and operatively connected to the operator interface at a second end;
   a bracket being rotatably mounted to the second end of the support structure, a portion of the bracket being configured to actuate between a retracted position and an extended position relative to the bracket;
   an arm assembly coupled to the operator interface and pivotably coupled to the bracket, the arm assembly configured to pivot the operator interface between a storage position and an open position,
   wherein in the storage position, the operator interface is received within a storage portion of the operator console, and in the open position, the operator interface is moved upright for use by an operator of the machine; and
   a lid for enclosing the operator interface within the storage portion of the operator console, when the operator interface is in the storage position.

2. The mounting structure of claim 1, wherein the storage portion defines a recessed compartment to receive the operator interface in the storage position.

3. The mounting structure of claim 1, wherein the arm assembly defines a lower end and a top end, the lower end being pivotally connected at a pivot joint to the bracket and the top end being coupled to the operator interface.

4. The mounting structure of claim 3, wherein the arm assembly includes a clasp lock assembly for releasably locking the arm assembly in one of the storage position and the open position of the operator interface.

5. The mounting structure of claim 4 further comprising a second actuator for engaging and disengaging the clasp lock assembly.

6. The mounting structure of claim 3, wherein the top end of the arm assembly includes an access handle configured to be releasably engaged with a complimentary member of the bracket when the operator interface is in the open position.

7. The mounting structure of claim 1 further includes a fluid operated strut coupled to the bracket and configured to slide the bracket between the retracted and the extended position.

8. The mounting structure of claim 7 further includes a first actuator being operably coupled and configured to actuate the fluid operated strut for sliding the bracket between the retracted and the extended position.

9. The mounting structure of claim 1 further comprising a rail fixedly coupled to the bracket, wherein the bracket is slidable on the rail to move between the retracted position and the extended position.

10. An operator station for a machine comprising:
an operator interface,
a mounting structure for supporting the operator interface within the operator station, the mounting structure including:
an operator console;
a support structure extending from the operator console, the support structure fixed at a first end to the operator console and operatively connected to the operator interface at a second end;
a bracket being rotatably mounted to the second end of the support structure, a portion of the bracket being configured to actuate between a retracted position and an extended position relative to the bracket;
an arm assembly coupled to the operator interface and pivotably coupled to the bracket, the arm assembly configured to pivot the operator interface between a storage position and an open position,
wherein in the storage position, the operator interface is received within a storage portion of the operator console, and in the open position, the operator interface is moved upright for use by an operator of the machine; and
a lid for enclosing the operator interface within the storage portion of the operator console, when the operator interface is in the storage position.

11. The operator station of claim 10, wherein the storage portion defines a recessed compartment to receive the operator interface in the storage position.

12. The operator station of claim 10, wherein the arm assembly defines a lower end and a top end, the lower end being pivotally connected at a pivot joint to the bracket and the top end being coupled to the operator interface.

13. The operator station of claim 12, wherein the arm assembly includes a clasp lock assembly for releasably locking the arm assembly in one of the storage position and the open position of the operator interface.

14. The operator station of claim 13, wherein the mounting structure further comprises a second actuator for engaging and disengaging the clasp lock assembly.

15. The operator station of claim 12, wherein the top end of the arm assembly includes an access handle configured to be releasably engaged with a complimentary member of the bracket when the operator interface is in the open position.

16. The operator station of claim 10, wherein the mounting structure further comprises a fluid operated strut coupled to the bracket and configured to slide the bracket between the retracted and the extended position.

17. The operator station of claim 16, wherein the mounting structure further includes a first actuator being operably coupled and configured to actuate the fluid operated strut for sliding the bracket between the retracted and the extended position.

18. The operator station of claim 17, wherein the mounting structure further comprising a rail fixedly coupled to the bracket, wherein the bracket is slidable on the rail to move between the retracted position and the extended position.

19. A construction machine, comprising:
an operator station including an operator interface; and
a mounting structure for supporting the operator interface within the operator station, the mounting structure including:
an operator console;
a support structure extending from the operator console, the support structure fixed at a first end to the operator console and operatively connected to the operator interface at a second end;
a bracket being rotatably mounted to the second end of the support structure;
a fluid operated strut coupled to the bracket and configured to slide a portion of the bracket between a retracted position and an extended position relative to the bracket;
an arm assembly defining a lower end and a top end, the lower end being pivotally connected to the bracket at a pivot joint and the top end being coupled to the operator interface, the arm assembly configured to pivot the operator interface between a storage position and an open position,
wherein in the storage position, the operator interface is received within a recessed compartment of the operator console, and in the open position, the operator interface is moved upright for use by an operator of the construction machine; and
a lid for enclosing the operator interface within the recessed compartment of the operator console, when the operator interface is in the storage position.

20. The construction machine of claim 19, wherein the mounting structure further comprises a rail fixedly coupled to the bracket, wherein the bracket is slidable on the rail to move between the retracted position and the extended position.

* * * * *